Nov. 29, 1927.  
A. HORWITZ  
1,651,331  
RESILIENT SUPPORTING DEVICE  
Filed Oct. 7, 1924

INVENTOR  
Alexander Horwitz  
BY  
Howard E Thompson  
ATTORNEY

Patented Nov. 29, 1927.

1,651,331

UNITED STATES PATENT OFFICE.

ALEXANDER HORWITZ, OF NEW YORK, N. Y.

RESILIENT SUPPORTING DEVICE.

Application filed October 7, 1924. Serial No. 742,135.

This invention relates to resilient support and particularly to the construction of a resilient tire and the substitution of a substantially rigid annular member for the usual inflatable inner tube; and the object of the invention is to provide a tire or shoe fashioned to form an annular chamber therein and being split on its inner surface to give access to said annular chamber and to mount in said annular chamber a substantially rigid circular or annular member fitting snugly in said chamber and adapted, when the tire is in use, to distribute the resilient support throughout substantially the entire area of the resilient tire or shoe; a further object being to provide a ring-like member or body which is so constructed as to retain the tread portion of a shoe in substantially inflated or fully extended position, said member or body forming, by virtue of its construction or the construction of the tire, circumferentially spaced chambers within said tire; and with these and other objects in view, the invention consists in a device of the class and for the purpose specified which will not only provide the required resiliency, but which will be rendered puncture-proof as hereinafter described and claimed.

The invention is fully disclosed in the following specification, of which the accompanying drawing forms a part, in which the separate parts of my improvement are designated by suitable reference characters in each of the views, and in which:—

Figure 1:
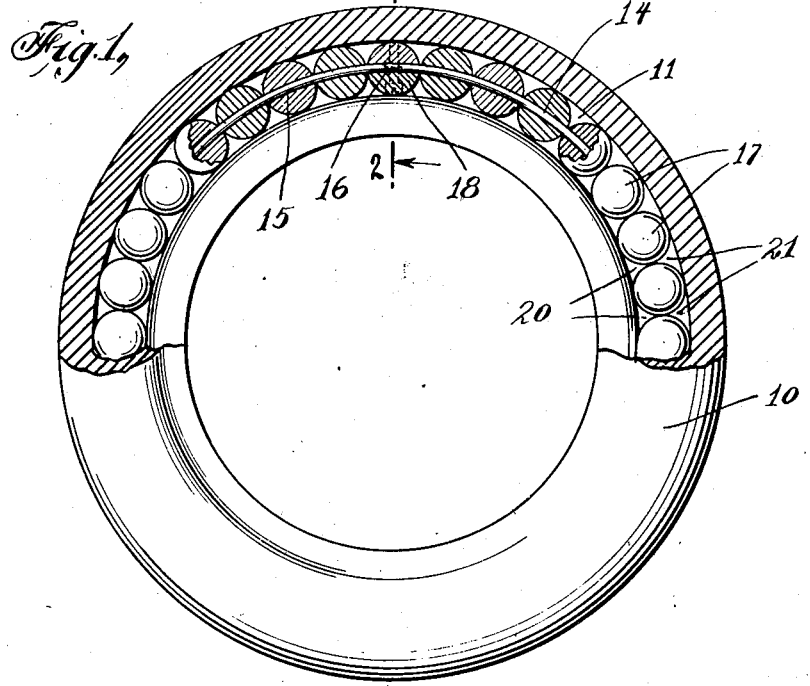
Fig. 1 is a side view of a tire made according to my invention with part of the construction broken away and in section.
Figure 2:
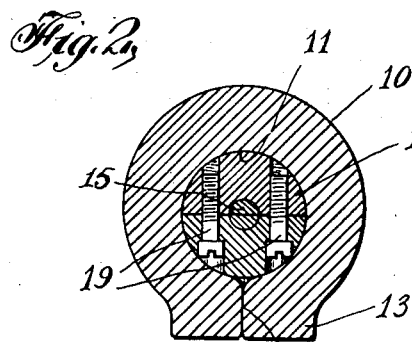
Fig. 2 is a section on the line 2—2 of Fig. 1 on an enlarged scale.
Figures 3, 5:
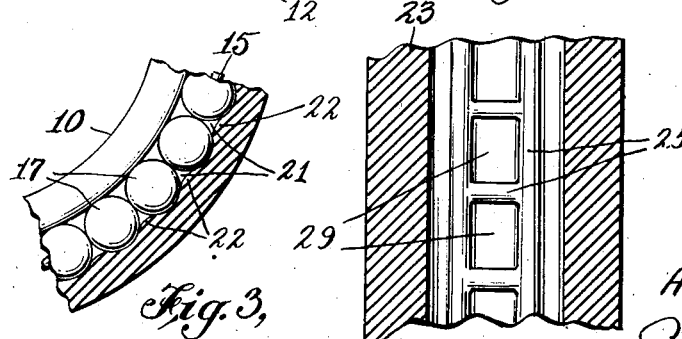
Fig. 3 is a detail sectional view of a part of the construction shown in Fig. 1 and showing a modification.
Fig. 5 is a partial sectional view on the line 5—5 of Fig. 4.

In carrying my invention into effect, especially as shown in Figs. 1 to 3 inclusive, I provide a tire 10 commonly known as a shoe which is constructed along the general lines of tire constructions with the exception that the tread portion, side walls and rim portion thereof are constructed heavier than is the usual custom with pneumatic tires as will be clearly seen on a consideration of Figs. 1 and 2 of the drawing, and within the tire 10 is a circumferential chamber 11 substantially circular in form in cross section and the admission to which is controlled by a circumferential split 12 formed centrally of the rim portion 13 of the tire, which rim portion is fashioned to receive the usual or any desired rim for mounting the same on the wheel of a vehicle.

Within the chamber 11 is mounted a substantially rigid circular or annular member 14, which in the construction shown in Figs. 1 to 3 inclusive is composed of a strong and durable rod 15, of circular form, detachably coupled together as at 16, and mounted on the rod 15 circumferentially thereof and in juxtaposition are a plurality of spherical or substantially spherical bodies 17, one of which, the body 18, is composed of separate parts, coupled together by bolts or screws 19 as seen in Fig. 2 of the drawing. This construction facilitates the mounting of the rod 15 within the chamber 11.

It will be noted that the spherical or substantially spherical bodies 17 form therebetween and on the inner and outer faces thereof and in the chamber 11, spaces 20 and 21 respectively. In Fig. 3 of the drawing, the spaces 21 are considerably smaller than as shown in Fig. 1 of the drawing by providing projecting members 22 on the tread portion of the tire 10 and the projecting members 22 also serve to retain the member 14 against displacement in the chamber 11.

In the use of the tire 10 as shown in Figs. 1 to 3 inclusive, it will be understood that the apparatus to be resiliently supported, for example a vehicle, will depress the inner portion of the tire in the direction of the surface on which the tread of the tire rests, which operation will force the annular member or body 14 downwardly in the direction of the tread portion, and in this operation all of the spherical bodies 17 below the horizontal center line of the wheel will cooperate with the inner face of the tread portion to compensate for and operate to resiliently support the vehicle load while the spherical bodies above said horizontal line will engage the inner face of the rim portion to correspondingly distribute the vehicle load.

In the present methods of vehicle resilient support or the use of pneumatic tires, it is well known that the effective resiliency is that portion of the inner tube and the tire enclosing the same engaging the surface over which the wheels are passing and to increase the resilient area, what are known as 'balloon tires have been devised and have effectively accomplished the desired result. The distinctive feature of my invention is to provide means for distributing the vehicle load to be supported throughout substantially the entire circumferential area of a tire composed of resilient material by employing within the core or chamber of the tire, a member such as the member 14 constructed to maintain a substantially circular position at all times and which is substantially rigid and capable of movement eccentrically with reference to the axis of the wheel on which the tire is mounted to permit substantially the entire resilient properties of the tire to be effective in the support of the vehicle.

Figure 4:
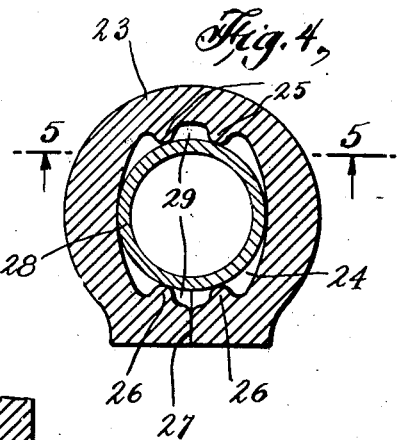
Fig. 4 is a view similar to Fig. 2 but showing a further modification.

In Figs. 4 and 5 of the drawing, I have shown a modified form of construction in which a tire 23 of substantially the same contour as the tire shown in Figs. 1 and 2 of the drawing is employed, but in the last named figures, the chamber 24 within the tire 23 is substantially elliptical in form in cross section and provided with inwardly projecting rib members 25 and 26 on the inner faces of the tread and rim portion of the tire as clearly shown in Fig. 4 of the drawing, said rib members being arranged longitudinally or circumferentially of the tire and transversely as clearly seen in Fig. 5 of the drawing, the rib members 25 being shown in said figure.

The tire 23 at the rim portion thereof is divided centrally as shown at 27 to permit of the insertion of an annular member 28 into the chamber 24 and the member 28 is preferably in the form of a tube of substantially rigid material constructed to permit of its insertion into the chamber 24 and of material suitable for use within the tire 23 and capable of maintaining a fixed circular form. It will be noted that when the member 28 is within the chamber 24, the same bears upon the rib members 25 and 26.

With the construction shown in Figs. 4 and 5 of the drawing, the rib members 25 and 26 form therebetween chambers 29 when the member 28 is within the tire 23, and these chambers form air pockets which will aid in the resiliency of the tire as will be apparent.

It will be understood that the members 17 as shown in Figs. 1 to 3 inclusive and the member 28 illustrated in Fig. 4 of the drawing may be composed of rigid material or of material having resilient or elastic properties, it being apparent that said members in combination with the tire structure should be sufficient to provide resilient support for a predetermined vehicle and to maintain the tire or the shoe portion thereof in a substantially full and expanded position and yet provide for a resiliency substantially equal to that of a pneumatic tire in the operation of the vehicle, and while I have shown and described certain details of construction for carrying my invention into effect, it will be understood that I am not necessarily limited to these details and various changes therein and modifications thereof may be made within the scope of the appended claims without departing from the spirit of my invention or sacrificing its advantages.

The use of the word "normally" in the claims, describing the utility of the ring body for retaining the tread and rim portions normally in fixed relation, relates to the tire structure when not in use, or in other words, when the tire is not subject to the load of the vehicle in resting upon or traveling over a roadway.

Having fully described my invention, what I claim as new and desire to secure by Letters Patent, is:—

1. A resilient supporting device of the class described comprising an annular shoe of predetermined form in cross section and having tread and rim portions spaced apart by an annular chamber, means adapted to be mounted in the chamber of said member and cooperating with the tread and rim portions thereof to distribute the resilient support throughout the major portion of said shoe member, said means comprising a split ring, a plurality of bodies mounted on said ring in juxtaposition, said bodies being spherical in form, and one of said bodies being composed of two semi-spherical parts adapted when coupled together to retain the ends of said ring in position.

2. A tire of the class described comprising a shoe member, the cross sectional form of which is tubular and such as to provide comparatively heavy walls throughout the entire cross section of the shoe and to form an annular chamber within the shoe and between the tread and rim portions thereof, the rim portion of said shoe being severed centrally thereof to form separate side portions, the separate sides of the rim portion of the shoe being adjacent and abutting when the shoe is in use, a ring body adapted to be placed in the chamber of the shoe and engaging the tread and rim portions thereof and being composed of substantially rigid material for normally maintaining the tread and rim portions of the shoe in predetermined spaced relation, and said ring body being movable eccentrically with reference to the rim on which the shoe is mounted when the shoe is in use whereby the resiliency is distributed throughout the major portion of the tire circumference.

3. A tire of the class described comprising a shoe member having comparatively thick tread and rim portions, an annular chamber within said member, the rim portion of said member being divided centrally and circumferentially to give access to the chamber of said member, a filler member adapted to be placed in the chamber of the shoe member and comprising a ring on which is arranged in juxtaposition, a plurality of spherical bodies, said ring extending through the axis of said bodies, and said spherical bodies being adapted to engage the tread and rim portions of the shoe when the filler member is mounted in the annular chamber of the shoe member and the tread portion of the shoe having spaced inwardly projecting members positioned in the recesses between adjacent spherical bodies.

4. A resilient supporting device of the class described comprising an annular shoe of predetermined form in cross section and having substantially closed tread and rim portions spaced apart by an annular chamber, and means adapted to be mounted in the chamber of said member and cooperating with the tread and rim portions thereof to distribute the resilient support throughout the major portion of said shoe member, said means comprising a split ring, and a plurality of spherical bodies mounted on said ring in abutting position, and said spherical bodies forming within said chamber recesses V-shaped in outline spaced circumferentially of the tread and rim portions.

5. In a tire, a filler member adapted to be mounted in the annular chamber within the tire, said member comprising a ring and a plurality of spherical bodies mounted on said ring in abutting relation with the ring extending through the axis of said bodies, and said spherical bodies when mounted in the annular chamber of the tire forming spaced recesses V-shaped in outline arranged circumferentially of the tire and rim portions and the inner face of the tread portion of the tire having circumferentially spaced recesses forming seats for said spherical bodies.

In testimony that I claim the foregoing as my invention I have signed my name this 2nd day of Oct., 1924.

ALEXANDER HORWITZ.